United States Patent
Chang

(10) Patent No.: US 7,025,470 B2
(45) Date of Patent: Apr. 11, 2006

(54) MECHANISM FOR ROTATABLE IMAGE-TAKING DEVICE

(76) Inventor: Chao-Hung Chang, No. 12-3, Thirty one Rd., Industrial area, Taichung (TW)

( * ) Notice: Subject to any disclaimer, the term of this patent is extended or adjusted under 35 U.S.C. 154(b) by 1 day.

(21) Appl. No.: 10/893,734

(22) Filed: Jul. 19, 2004

(65) Prior Publication Data

US 2006/0012900 A1      Jan. 19, 2006

(51) Int. Cl.
    *G02B 7/182*    (2006.01)
(52) U.S. Cl. .................................. 359/874; 359/877
(58) Field of Classification Search ........ 359/872–874, 359/876, 877
    See application file for complete search history.

(56) References Cited

U.S. PATENT DOCUMENTS

| 4,750,486 A | * | 6/1988 | Butler et al. ................... 606/18 |
| 5,177,644 A | * | 1/1993 | Stark ........................... 359/896 |
| 5,400,184 A | * | 3/1995 | Kuklo .......................... 359/873 |
| 5,751,460 A | * | 5/1998 | Harrell et al. ............... 359/198 |

* cited by examiner

*Primary Examiner*—Mark A. Robinson

(57) ABSTRACT

An improved mechanism for rotatable image taking device, the rotatable mirror set in front of a fixed image-taking device with angle of reflection controlling mechanism at the rear side of the mirror. The mechanism includes a fixed rod with universal joint at the center, a horizontal rotating rod with universal joint, and a vertical rotating rod with universal joint. There are also three universal joints situated at the center, upper or lower side, and left or right side of the back face of the mirror. The invention can reduce the total cost of the rotatable image-taking device and improve the speed of changing angles.

3 Claims, 3 Drawing Sheets

MECHANISM FOR ROTATABLE IMAGE-TAKING DEVICE

FIELD OF INVENTION

The invention relates to an improved mechanism for rotatable image-taking device capable of reducing the overall cost of the rotatable image-taking device and improving the speed of panning and tilting.

BACKGROUND

The crime rate increases significantly along with the rapid development of the society and the increased population dwelling in the city, any business or residence could be the target of crime, and turning small alleys into public security problem areas. To protect the lives and properties of general public, surveillance equipments that intend to scare off the criminals and to record the offender's images, is commonly installed around streets, business compounds, banks or public buildings, so as to serve as the clues for breaking criminal cases.

In most of the conventional moveable video camera, a motor-driven universal mount is usually placed at the bottom of the camera. This type of camera is usually expensive, bulky and heavy, thereby the motor-driven universal mount is easily damaged due to frequent rotation after prolong period of usage, and thus incurring maintenance and repair costs. The slow panning and tilting speed of the camera due to the bulky and heavy body of the camera also means slow tracking and important images could be missed, thereby failing to achieve its intended purposes.

SUMMARY OF INVENTION

It is the objective of this invention to provide an improved mechanism for rotatable image-taking device capable of reducing the overall cost and improving the speed of panning and tilting.

le;.5qTo achieve the above objective, this invention discloses an improved mechanism for rotatable image-taking device, comprising: a rotatable mirror set provided in front of a stationary image-taking device; and a reflective angle controlling mechanism provided to the rear of the mirror, The mechanism includes a fixed rod with universal joint at the center, a horizontal rotating rod with universal joint, and a vertical rotating rod with universal joint. There are also three universal joints situated at the center, upper or lower side, and left or right side of the back face of the mirror. The invention can reduce the total cost of the rotatable image-taking device and improve the speed of panning and tilting.

BRIEF DESCRIPTION OF THE DRAWINGS

These and other modifications and advantages will become even more apparent from the following description of the preferred embodiment of the invention and from the drawings in which.

DETAILED DESCRIPTION OF THE PREFERRED EMBODIMENTS

Figure 1:
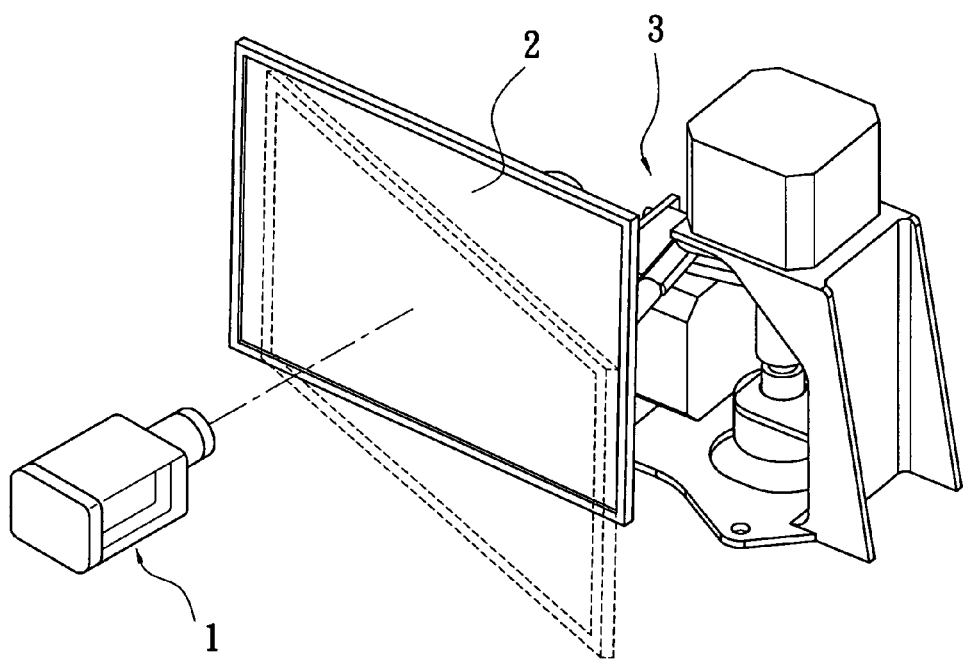
FIG. 1 is the perspective view illustrating this invention in the state of use.
Figure 2:
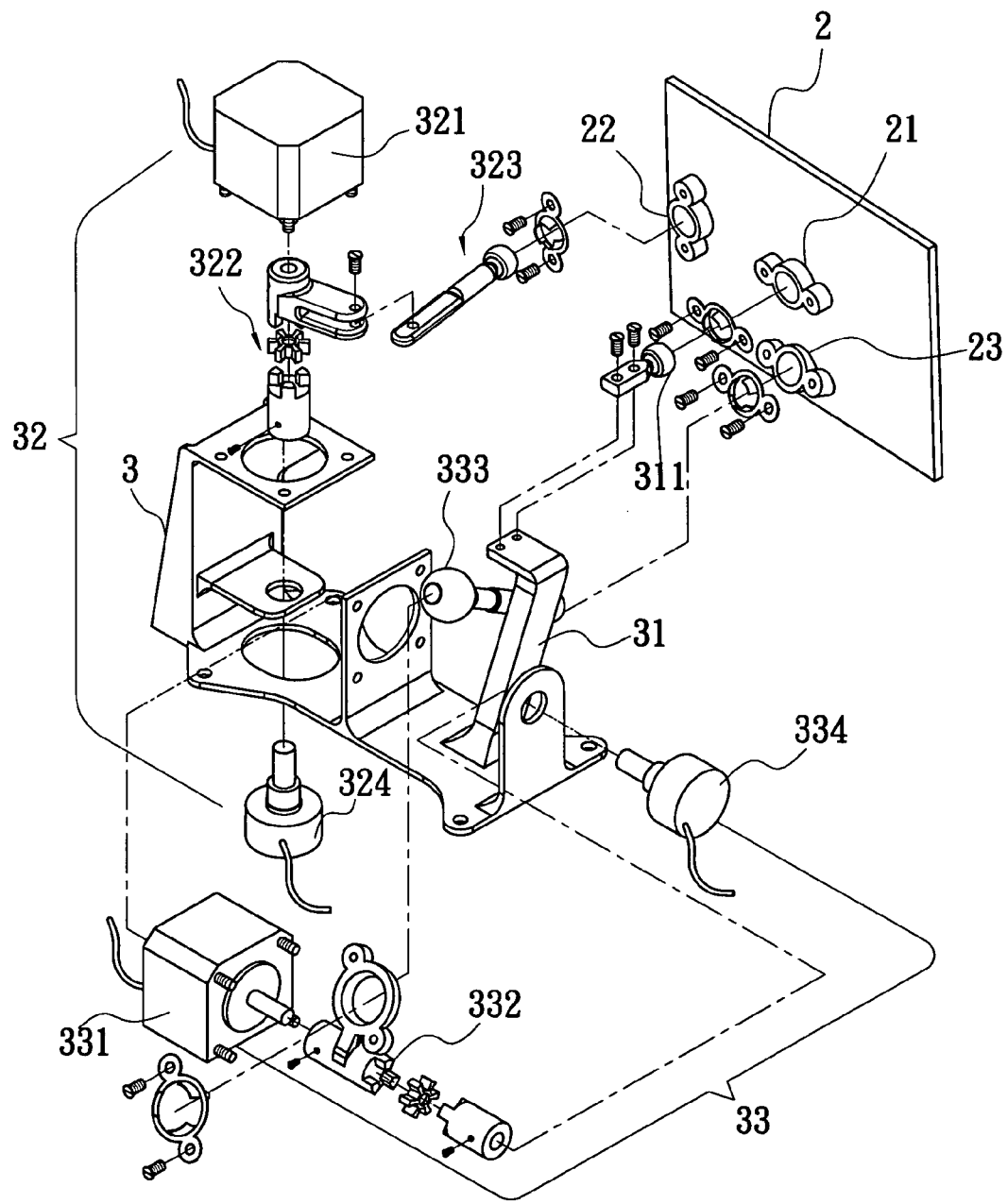
FIG. 2 is an exploded view of this invention.
Figure 3:
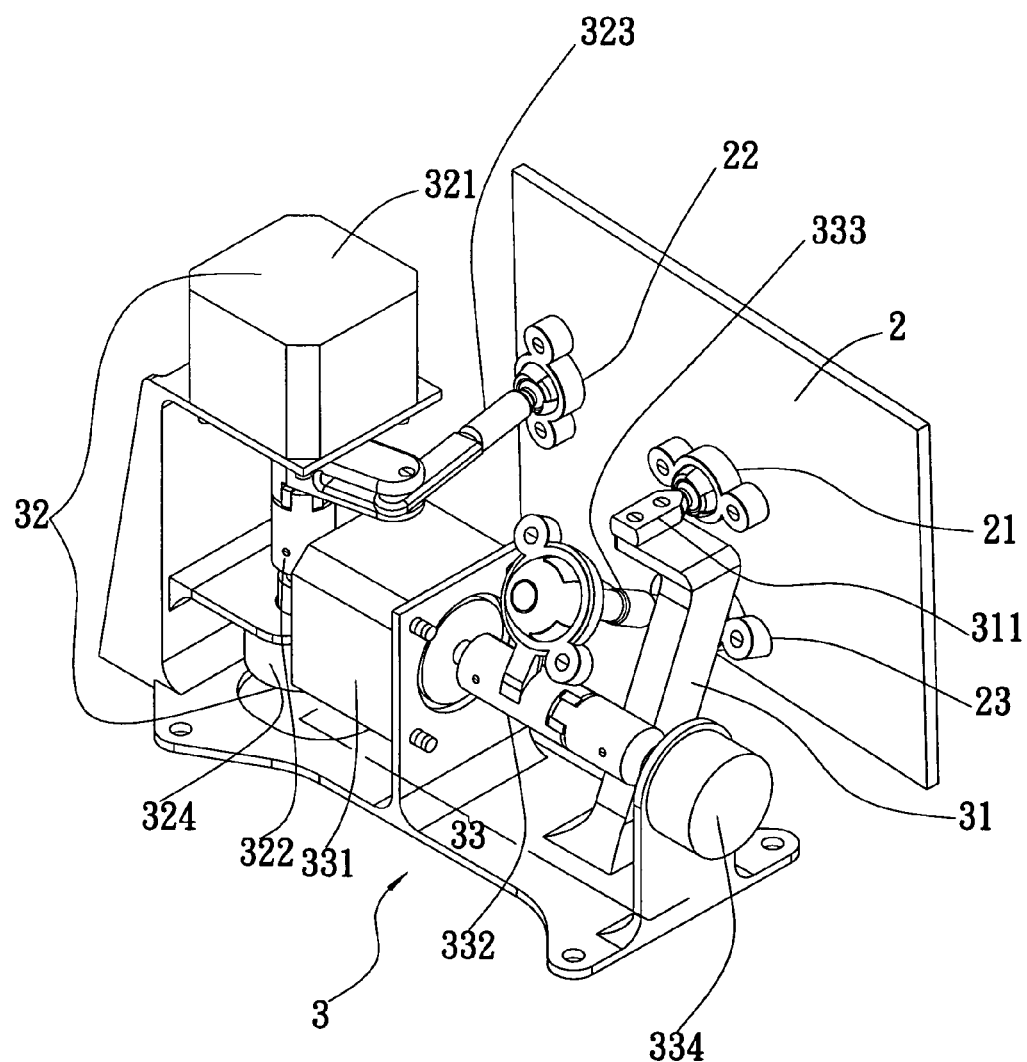
FIG. 3 is the schematic view illustrating the structural assembly of this invention.

As shown in FIGS. 1, 2, and 3, the image-taking device includes the rotatable mirror 2 provided in front of a stationary image-taking device 1; and the reflective angle controlling mechanism 3 provided to the rear of the mirror 2. The mechanism 3 comprises the followings.

A support rod 31 is erected at the bottom face of the reflective angle controlling mechanism 3 and has the central universal joint 311 provided to the top thereof. The central universal joint 311 is pivoted to the center of the rear of the mirror 2.

A horizontal rotating device 32 includes a first motor 321 provided to the top thereof. A first rotating rod 322 is connected to the shaft of the first motor 321. A first universal joint rod 323 has an end being pivotally connected the side of the first rotating rod 322. The first universal joint rod 323 has another end being pivoted to the center of either right side or left side of the rear of the mirror 2. A first detecting device 324 is provided to the bottom of the first rotating rod 322. The detecting device 324 moves along with the rotation of the first rotating rod 322, so as to determine the displacement along horizontal-axis based on values detected by the first detecting device 324.

A vertical rotating device 33 has a second motor 331 provided to one end thereof. A second rotating rod 332 is connected to the shaft of the second motor 331. A second universal joint rod 333 has an end being pivotally connected the side of the second rotating rod 332. The second universal joint rod 333 has another end being pivoted to the center of either upper side or lower side of the rear of the mirror 2. A second detecting device 334 is provided to the other end of the second rotating rod 332. The second detecting device 334 moves along with the rotation of the second rotating rod 332, so as to determine the displacement along vertical-axis based on values detected by the second detecting device 334.

A mirror 2 with three universal joint supports 21, 22, 23 are provided to each of the center, either upper side or lower side, and either left side or right side of the rear of the mirror 2, for pivoting to the central, horizontal and vertical universal joints 31, 32, 33 of the controlling mechanism 3.

According to the structural design of this invention, the reflective angle of the mirror may be periodically adjusted by means of the microcomputer. The vertical rotating device and horizontal rotating device adjust the angle of the mirror, at the same time the detecting devices would feed back the values representing movements of these rotating devices, such that the microcomputer is able to precisely acquire the displacements along the X and Y axes, so as to precisely control the angles for taking images. The detecting devices may be variable resistors, position encoders, or any angular sensing device. As such, the motor-driven universal mount that is commonly provided to the conventional image-taking device may be eliminated, so as to eliminate the repair cost incurred from abrading the universal mount due to the bulky and heavy camera body. The lightweight of the mirror adopted by this invention also significantly reduces the overall cost of the image-taking device while improving the speed of panning and tilting.

The improved mechanism for rotatable image-taking device as described above makes improvements to the conventional device and meets the patentability requirements prescribed in the Law. A patent application is hereby submitted.

This invention is related to the novel creation that makes the breakthrough in the art. Aforementioned explanations, however, are directed to the description of preferred embodiments according to this invention. Since this invention is not limited to the specific details described in connection with the preferred embodiments, changes and implementations to certain features of the preferred embodiments without altering the overall basic function of the invention are contemplated within the scope of the appended claims.

What is claimed is:

1. An improved mechanism for rotatable image-taking device, including: a rotatable mirror provided in front of a stationary image-taking device; and a reflective angle controlling mechanism provided to the rear of said mirror, wherein said mechanism comprises:

a support rod erected at the bottom face of said reflective angle controlling mechanism, and a central universal joint provided to the top thereof, wherein said central universal joint is pivoted to the center of the rear of said mirror;

a horizontal rotating device comprising: a first motor provided to the top thereof, a first rotating rod connected to a shaft of said first motor, a first universal joint rod with an end being pivotally connected to a side of said first rotating rod and another end being pivoted to the center of either a right side or left side of the rear of said mirror, a first detecting device provided to the bottom of said first rotating rod, wherein said first detecting device moves along with the rotation of said first rotating rod, so as to determine displacement along a horizontal-axis;

a vertical rotating device comprising: a second motor provided to one end thereof, a second rotating rod connected to a shaft of said second motor, a second universal joint rod with an end being pivotally connected to a side of said second rotating rod and another end being pivoted to the center of either an upper side or lower side of the rear of said mirror, a second detecting device provided to the other end of said second rotating rod, wherein said second detecting device moves along with the rotation of said second rotating rod, so as to determine displacement along a vertical-axis;

said mirror including: three universal joint supports, which are each provided to the center, either upper side or lower side, and either left side or right side of the rear of said mirror, for pivoting to the central, horizontal and vertical universal joints of said controlling mechanism.

2. The improved mechanism for the rotatable image-taking device of claim 1, wherein said detecting devices are either variable resistors, position encoders, or any angular sensing device.

3. The improved mechanism for the rotatable image-taking device of claim 1, wherein said mirror is one of a flat mirror, convex mirror, or concave mirror.

* * * * *